June 23, 1970  A. S. HUBIN  3,516,891
APPARATUS FOR APPLYING FILM TO BLANKS
Filed Nov. 23, 1965  7 Sheets-Sheet 1

United States Patent Office 3,516,891
Patented June 23, 1970

3,516,891
APPARATUS FOR APPLYING FILM TO BLANKS
Anthony S. Hubin, Appleton, Wis., assignor to Kimberly-Clark Corporation, Neenah, Wis., a corporation of Delaware
Filed Nov. 23, 1965, Ser. No. 509,389
Int. Cl. B32b *31/00*
U.S. Cl. 156—521          8 Claims

ABSTRACT OF THE DISCLOSURE

Apparatus for the application of films or patches of flexible film to blanks moving along a path of travel, the blanks being spaced and the film being supplied to a suction roll initially at a speed such that the film slips on the suction roll but is then grasped between a nip of the suction roll and a stencil roll. The film is accelerated to the speed of the suction roll and the acceleration is such as to cause film breakage along a previously partially severed line transversely of the film to provide a film path. Liquid adhesive applied to the stencil roll is transferred to the film and then serves to secure the film to a blank.

My invention relates to cartons or other containers having windows in them, and, more particularly, the invention relates to apparatus and methods for covering such windows with thin film.

It is an object of the present invention to provide an improved apparatus for applying thin film onto carton blanks in which the film is fed in a continuous length or web to the apparatus and is separated into segments in such a manner that the segments are applied to windowed carton or container blanks passing sequentially and in spaced relation through the apparatus with the segments and carton blanks having the same speeds at the time of application.

More particularly, it is an object of the invention to provide an improved apparatus of this type which comprises mechanism for partially severing a web of the thin film material and for carrying the film material to a nip between opposite rolls traveling faster than the continuous length of film material and at the same speed as the carton blanks for breaking the film material at its places of partial severance in order to provide segments of the material and for raising the speed of the segments to the faster speed of the windowed carton blanks passing through the apparatus. It is also an object of the invention to provide adhesive applying bosses in connection with one of the two last mentioned rolls so as to print the segments of film material in such a manner that they adhere along marginal portions thereof to the carton blanks about the windowed apertures in them.

The invention consists of the novel constructions, arrangements and devices, and to the novel methods embodied therein, to be hereinafter described and claimed for carrying out the above stated objects, and such other objects, as will be apparent from the following description of a preferred form of the apparatus of the invention, illustrated with reference to the accompanying drawings, wherein:

Like characters of reference designate like parts in the several views.

Figures 3, 14:
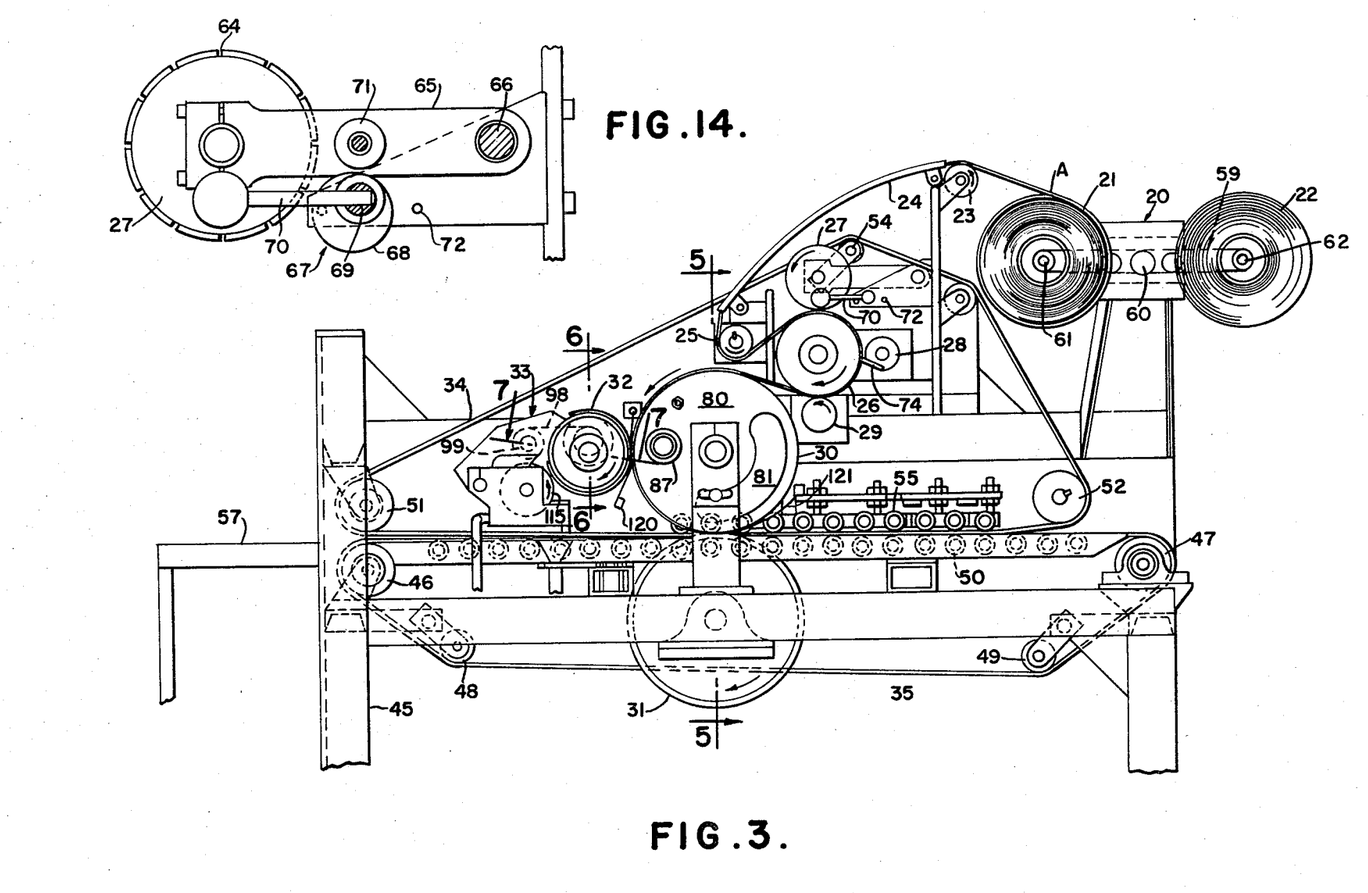
FIG. 3 is a side elevational view of apparatus for applying windows of polyethylene film onto carton blanks of the type illustrated in FIG. 2, and including a suction roll across which a web of polyethylene film traverses onto the carton blanks, a slitter wheel for providing a perforated longitudinal, medial line in the web, a rotatable knife for perforating the web transversely, a stencil roll having a stencil pad on its periphery for applying a liquid adhesive or glue onto the web on the suction roll in a predetermined closed pattern, and a glue roll rotatably disposed in a glue pot for applying glue onto the surface of the stencil roll.
FIG 14 is a side elevational view of the slitter wheel and associated mechanism.
Figures 4, 16:
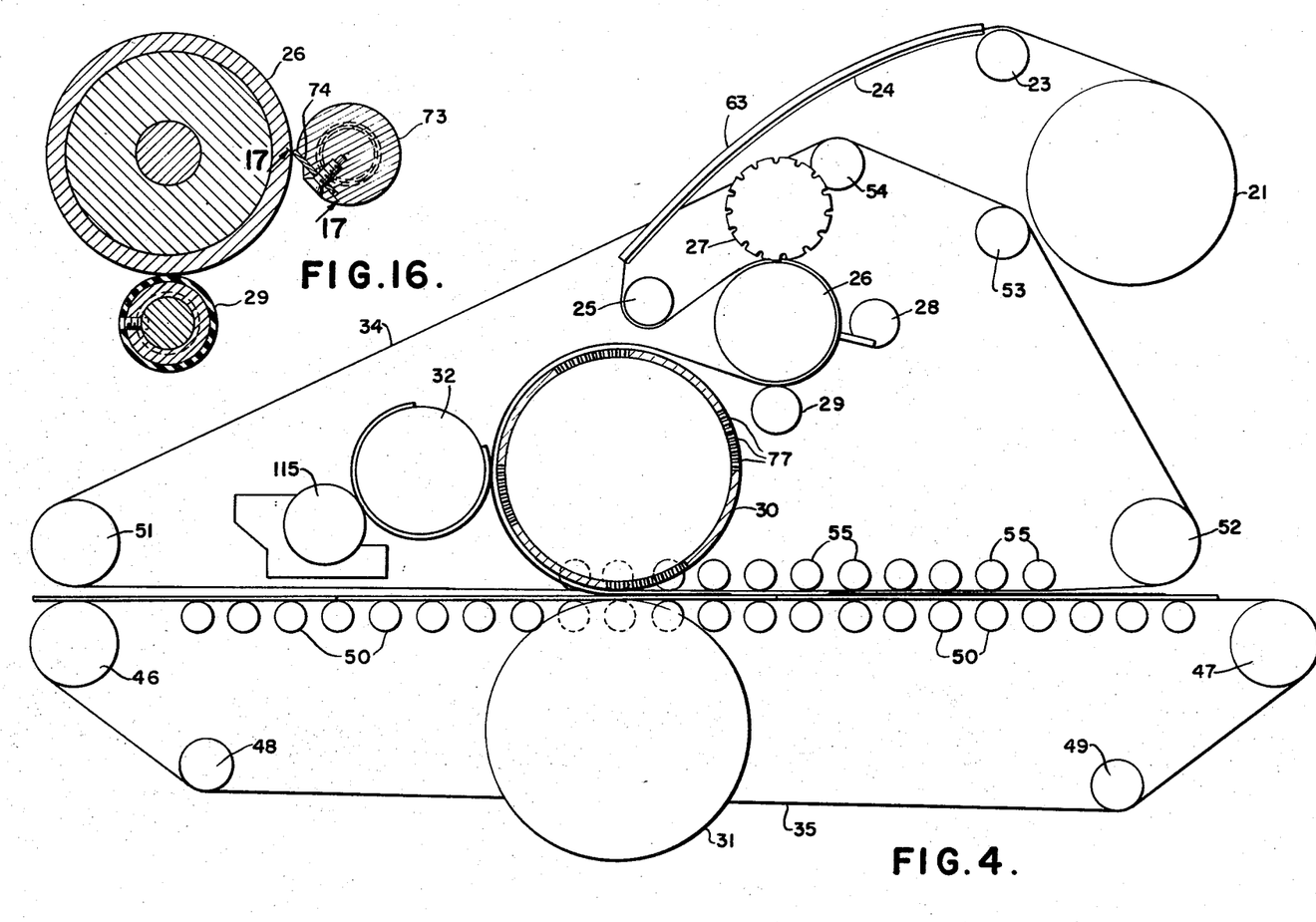
FIG. 4 is a diagrammatic side elevational view of the apparatus.
FIG. 16 is a sectional view of the rotatable knife and associated parts, the view being taken on a plane that is normal to the axis of rotation of the knife.

Referring now to the drawings and in particular to FIGS. 3 and 4, the window applying apparatus may be seen to comprise, in general, a standard 20 for supporting supply rolls 21 and 22 of polyethylene web A, a guide roll 23 for receiving the web A from the supply roll 21, a stationary curved guide plate 24 for receiving the web A from the roll 23, a guide roll 25 for receiving the web A from the guide plate 24, an anvil roll 26 for receiving the web A from the roll 25, a slitter disc 27 adapted to rest on the anvil roll 26 for slitting the web A longitudinally, a rotary knife mechanism 28 effective on the web A carried by the anvil roll 26 for cutting the web transversely, a pull roll 29 having a nip with the anvil roll 26 and effective on the web A in slit and transversely cut condition, a suction roll 30 for receiving a web A from the pull roll 29, a backup roll 31 having a nip with the suction roll 30 for passing both carton blanks and also sections of polyethylene web A therebetween, a stencil roll 32 for printing adhesive onto parts of the polyethylene web A, an adhesive or glue supply 33 for supplying adhesive to the stencil roll 32, and upper and lower belts 34 and 35 for conveying carton blanks between the rolls 30 and 31.

Figure 1:
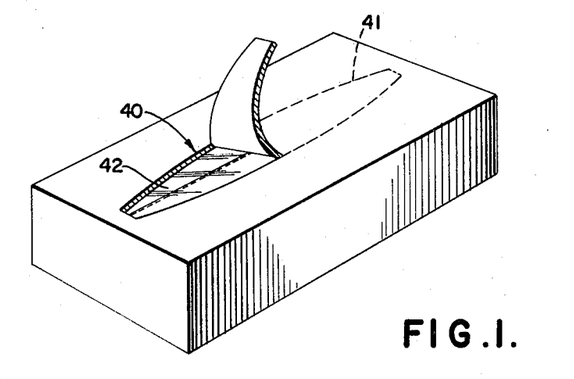
FIG. 1 is a perspective view of a carton with which the window applying apparatus of the invention may be used.
Figure 2:
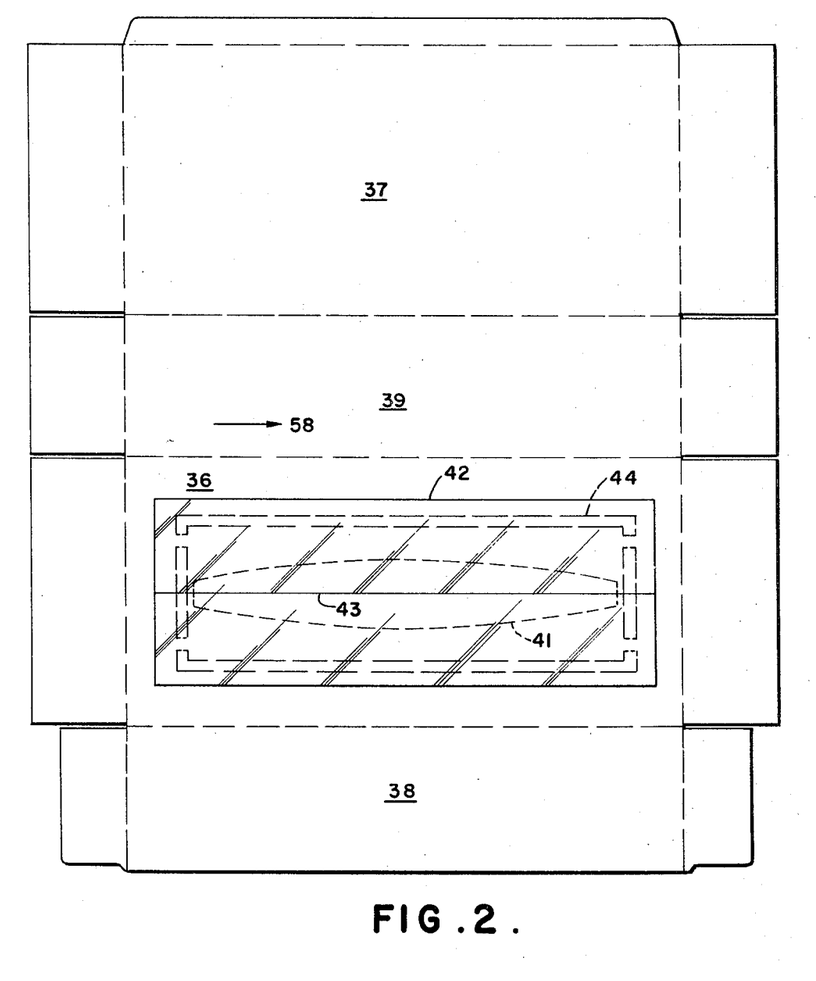
FIG. 2 is a view of a blank from which the carton of FIG. 1 may be made and showing the inner faces of such a blank.

A carton of the type for which the present apparatus is particularly suitable is shown in assembled form in FIG. 1 and is shown in knocked-down condition and in the form of a blank in FIG. 2 and comprises an upper panel 36, a bottom panel 37, and side panels 38 and 39. Various tabs and flaps are disposed on the edges of the blank, and the tabs and flaps and also the panels are defined by fold lines. The carton is of cardboard sheet stock or the like and when the blank is assembled by gluing the tabs to each other and to the panels, the carton appears as shown in FIG. 1. The carton is provided with a dispensing opening 40 which may be in the form of a narrow truncated ellipse. The opening 40 is defined by a marginal perforation line 41, and the user may remove the portion of the panel 36 within the perforation line 41 to form the opening 40 as shown in FIG. 1.

The underside of the top panel 36 has bonded to it a sheet 42 of flexible polyethylene film which is applied marginally to encircle the opening 40 and is perforated along a line 43 extending longitudinally of the medial axis of the opening 40. The carton is particularly adapted to contain interfolded facial tissues, and these facial tissues may be withdrawn from the carton after the portion of the top panel encircled by the perforation line 41 is removed and the perforation line 43 in the polyethylene sheet is broken by the user. The edges of the polyethylene sheet 42 along the perforation line 43 allows individual interfolded sheets to be withdrawn between the edges from the carton and prevent the sheets from falling back into the carton through the opening 40. A carton of this type is disclosed and claimed in the co-pending application of John D. Bates et al., Ser. No. 263,054, filed Mar. 5, 1963, now Pat. No. 3,239,097, granted Mar. 8, 1966.

The apparatus of the invention functions to apply the polyethylene sheet 42 to the underside of the top panel 36 and to glue it on a line 44 of substantial width that is spaced from and encircles the perforation line 41.

Considering the apparatus in greater detail, it may be seen ot comprise a frame 45, and rolls 46 and 47 are rotatably disposed on the ends of the frame for supporting the belts 35. The rolls 46 and 47 are of the same diameter and are disposed on the same level so as to provide horizontal upper passes of the belts 35 between them. Idler rolls 48 and 49 are provided to guide the lower passes of the belts 35, and a series of support rollers 50 are disposed beneath the upper horizontal passes of the belts 35 for supporting these passes of the belts.

Rolls 51 and 52, which correspond to the rolls 46 and 47, are provided for supporting lower passes of the belts 34 which are, in general, at a level slightly above that of the upper passes of the belts 35. Idler rolls 53 and 54 are provided on the frame 45 for supporting the upper passes of the belt, and a series of backup rollers 55 are provided for the lower passes of the belts 34 and are individually in vertical alignment with rollers 50. The backup rollers 55 may be adjusted vertically by means of suitable locking and adjusting assemblies 56 (see FIG. 5) so as to bring the lower passes of the belts 34 closer to the upper passes of the belts 35.

Figure 18:
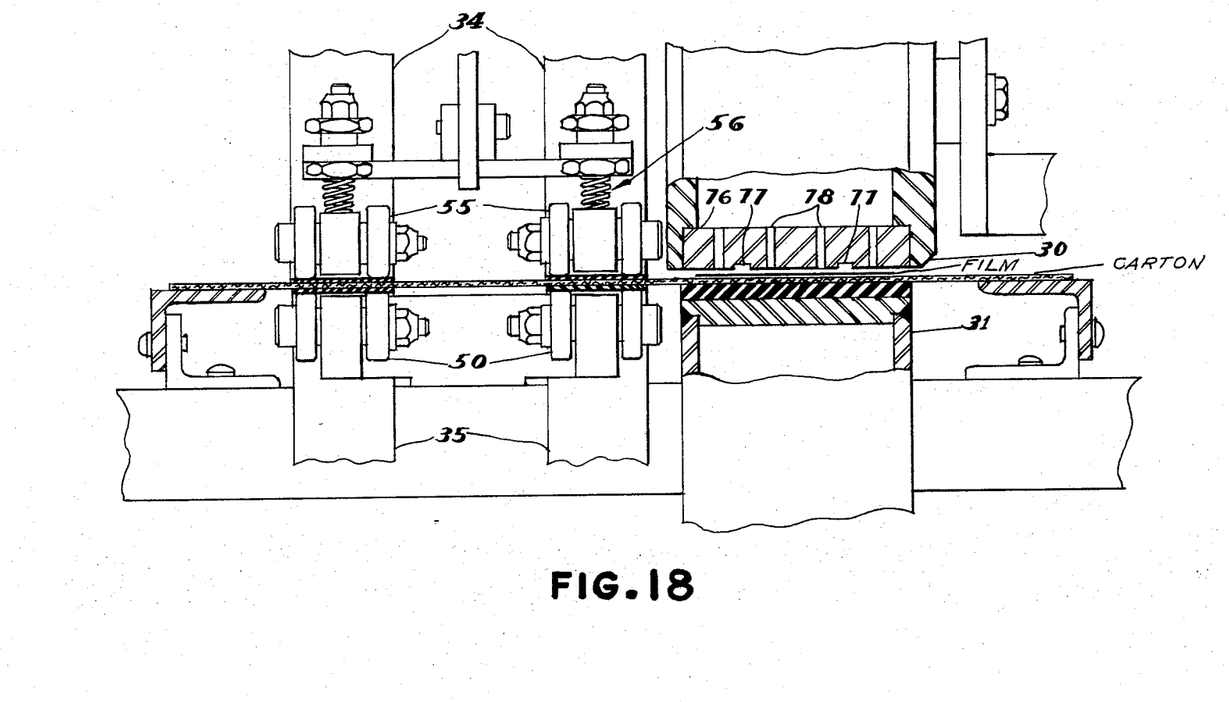
FIG. 18 is a view partially in section similar to FIG. 5 but illustrating the relationship of the polyethylene film and the carton in their traverse of the equipment.

The individual blanks (see FIG. 2) are fed sequentially into the apparatus between the rolls 46 and 51 and thereby between the belts 34 and 35 which act as conveyor belts (FIG. 18), and the blanks may be so fed from a support table 57 or from and by any suitable automatic feeding mechanism (not shown). The blanks travel in the direction indicated by the arrow 58 (see FIG. 2) between the belts 34 and 35 and rolls 46 and 51.

The polyethylene web supply rolls 21 and 22 are supported from opposite ends of a support arm 59 which is pivotally mounted at 60 to the standard 20. Suitable detent mechanism may be provided in connection with the pivotal mounting of the arm 59 to the standard 20 so that the arm is yieldably held in horizontal position as illustrated, and suitable braked mandrels 61 and 62 may be provided for the rolls 21 and 22 for rotatably mounting them on the ends of the arms 59.

The guide plate 24 has its upper end located adjacent the guide roll 23 and curves downwardly and has its lower end disposed adjacent the guide roll 25. The polyethylene web A from the roll 21, which is the supply roll located more adjacent to the guide roll 23, passes over the guide plate 24, and the guide plate 24 is provided with upturned side edge flanges 63 for preventing the web A from slipping off the plate 24.

The slitter disc 27 is peripherally sharpened and is provided with a plurality of space notches 64 in its periphery as shown in FIG. 14. These notches are relatively narrow and may be only .015 inch wide, for example, and they are spaced substantial distances apart, such as 1 inch. The slitter disc 27 is mounted on an arm 65 which is pivotally mounted at 66 with respect to the frame 45. The disc 27 is normally disposed in light engagement with the anvil roll 26, being disposed vertically over the latter rolls and the slitter disc may be raised off the anvil roll 26 by raising mechanism 67. The mecahnism 67 may comprise a cam disc 68 eccentrically fixed on a shaft 69 which is swung through 180° by means of a handle 70. A roller 71 is carried by the arm 65, and the disc 68 supports the arms 65 so that the slitter disc 27 has its desired light engagement with the anvil roll 26 when the handle 70 is in its illustrated horizontal position as shown in FIG. 14. The slitter disc 27 may be moved upwardly by rotating the shaft 69 through 180° by means of the handle 70, so that the disc 68 moves the roller 71 and thereby the arm 65 and disc 27 upwardly. The handle 70 and shaft 69 may be held from rotation through more than 180°, from one horizontal position of the handle 70 to the other horizontal position, by means of pins 72, for example.

The cutter 28 (see FIGS. 3, 4, 15 and 16) comprises a rotatable knife shaft 73 having a knife blade 74 screwed thereof so that the blade extends on a tangent to a circle about the center of rotation of the shaft 73 and has light contact between an edge of it and the surface of the anvil roll 26. The blade 74 is provided with a series of notches 75 in its edge that contacts the anvil roll 26, and these notches may, for example, be $\frac{1}{16}$ inch wide and spaced ½ inch apart.

It will be observed in the illustrated form of the apparatus that the center of the shaft 73 is located on the save level as the center of the anvil roll 26, and the pull roll 29 has its center disposed directly below the center of the anvil roll 26, although this arrangement can obviously be varied. The pull roll 29 is preferably a rubber covered roll.

Figures 5, 15, 17:
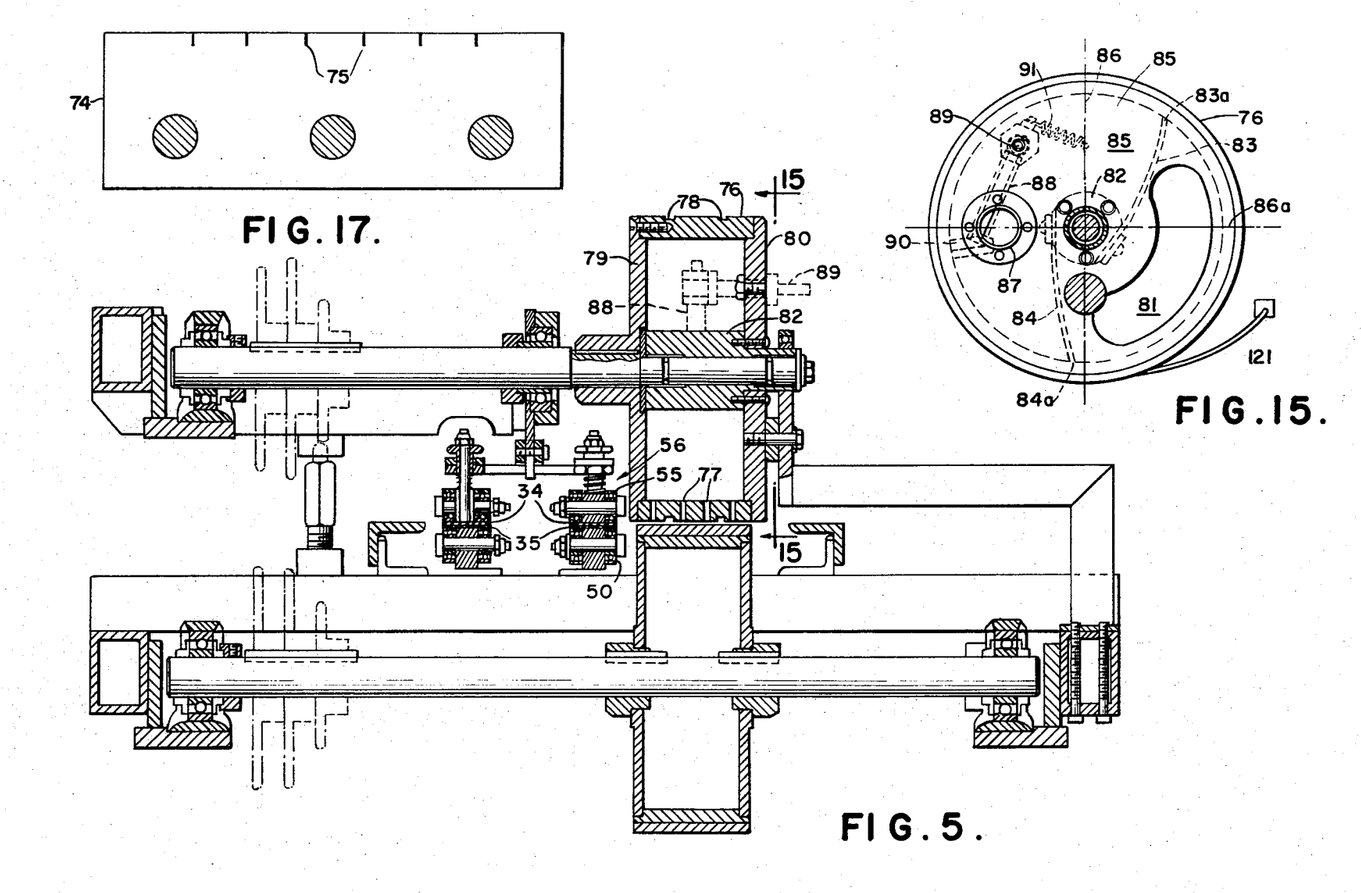
FIGS. 5 and 6 are sectional views on an enlarged scale taken respectively on lines 5—5 and 6—6 of FIG. 3.
FIG. 15 is a sectional view taken on line 15—15 of FIG. 5.
FIG. 17 is a plan view on an enlarged scale of the blade of the knife taken on line 17—17 of FIG. 16.
Figures 6, 7:
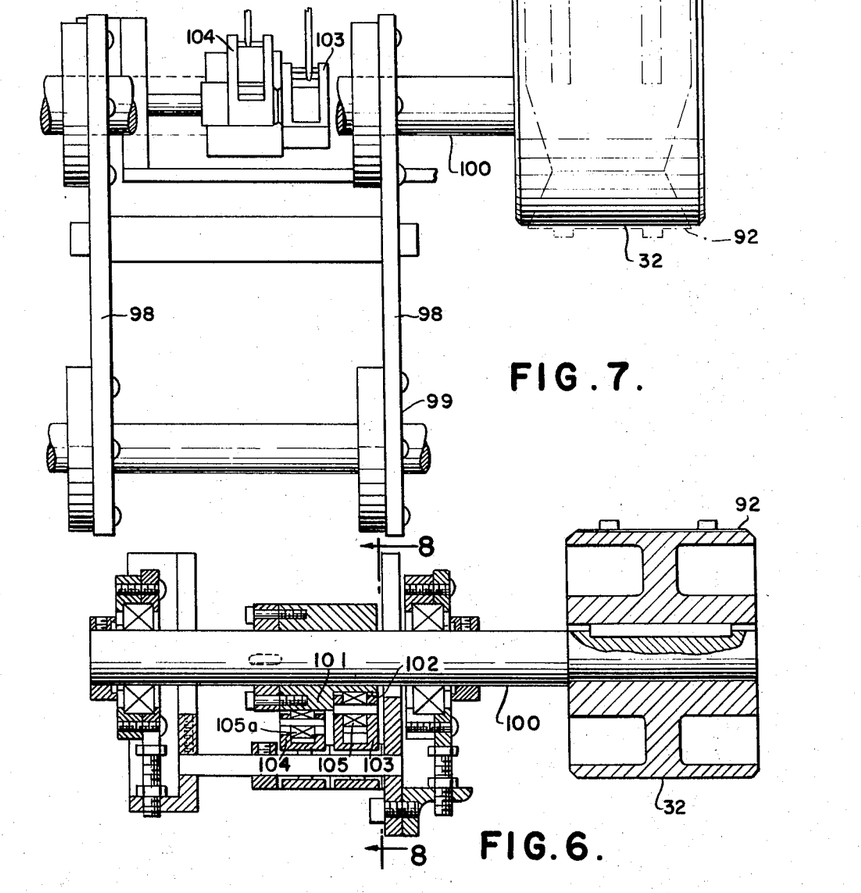
FIG. 7 is a fragmentary side elevational view taken on line 7—7 in FIG. 3.

The suction roll 30 comprises an annular rim or shell 76 having drilled openings 77 therethrough (see FIGS. 3, 5 and 15). The openings 77 are preferably located in spaced rows extending around the periphery of the suction roll, and the rim 76 is provided with a pair of shallow annular grooves 78 loacted between the two outermost rows of drilled openings 77 on each end of the rim 76. The grooves 78 may, for example, be ¼ inch wide and $\frac{1}{16}$ inch deep.

The suction roll 30 is provided with ends 79 and 80. The end 79 is fixed to the rim so as to be rotatable therewith, and the end 80 is fixed with respect to the frame 45. An opening 81 in the shape of an arc is provided in the end 80. The roll includes a stationary hub 82, and a pair of partitions 83 and 84 are fixed with respect to the hub and bear at their ends on the internal surface of the rim 76 so as to provide a suction gland 85 within the rim 76. It will be noted from FIG. 15 that the end of the partition 83 contacting the rim surface does so at a point 83a substantially spaced from a vertical center plane 86 and that the end 84a of the partition 84 contacts the internal surface of the rim 76 close to the plane 86, so that the gland 85 extends for more than 180° within the rim 76 and is nearly all located on one side of the center plane 86. A flanged opening 87 is provided in the end 80 of the suction roll, and suction may be applied within the gland 85 by means of this opening utilizing any suitable suction source and hose (not shown) interconnecting the source with the flanged opening 87. A suction conduit 88 is provided within the gland 85 and is swingably mounted about an inlet tube 89. The conducit 88 has end lips 90, and these are held in contact with the inner surface of the annular rim 76 by means of a spring 91 which acts on one end of the conduit 88. The tube 89 is in communication with the conduit 88, and more intense suction than that within the gland 85 may be applied to the internal surface of the rim 76 by means of the conduit 88, utilizing a higher suction source connected by means of tubing (not shown) to the tube 89. It will be noted that the end lips 90 of the conduit 88 bear on the internal surface of the rim 76 just below the horizontal center plane 86a of the suction roll 30.

Figure 12:
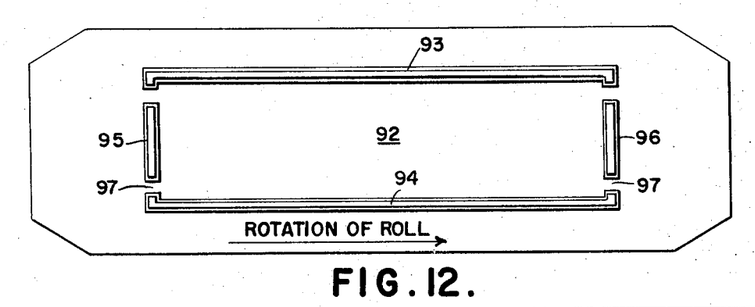
FIG. 12 is a plan view of a stencil pad on the surface of the stencil roll.
Figure 13:
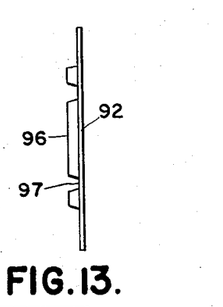
FIG. 13 is an end elevational view of the stencil pad.

The stencil roll 32 has a cylindrical periphery on which a stencil pad 92 is fixed (see FIGS. 12 and 13). The pad 92 has cylindrical boss portions 93 and 94 and boss portions 95 and 96 extending parallel with the center line of the stencil roll and separated by means of gaps 97 from the boss portions 93 and 94. The gaps 97 are the same distance apart as are the grooves 78 in the exterior surface of the suction roll 30.

The boss portions 93 to 96 of the stencil roll 32 are to carry adhesive to the polyethylene web A on the suction roll 30 as long as the web A is passing through the apparatus, and mechanism is therefore provided for raising the stencil roll 32 upwardly and away from the surface of the suction roll 30, so that the stencil roll 32 is not in contact with the suction roll 30 when the supply of web A through the apparatus is interrupted for any reason. In order to allow this upward movement of the stencil roll 32 for this purpose, the stencil roll 32 is rotatably mounted in arms 98 pivoted at 99 with respect to the frame 45, the stencil roll 32 being fixed on a shaft 100 that extends through and is rotatably disposed with respect to the arms 98 (see FIGS. 6 to 9). A disc 101 and a cam disc 102 are fixed on the shaft 100. Both of the discs 101 and 102 may be formed on the same integral piece and are cylindrical; however, the disc 101 is mounted to have its center on the center of the shaft 100 while the disc 102 is mounted on the shaft 100 so that its center is offset with respect to the center of the shaft 100.

A pair of levers 103 and 104 carrying rollers 105, 105a on their ends are pivotally mounted with respect to the machine frame 45 on a vertical plane 106 that is located on one side of but adjacent to the center of the shaft 100. The lever 103 is located beneath the cam disc 102, and its roller 105 is adapted to be in alignment with and to contact the cam disc 102; and the lever 104 is located beneath the disc 101 so that its roller 105a may contact and bear on the disc 101. Springs 107 and 108 respectively connect the armature 109 of a solenoid 110 with the levers 103 and 104. Springs 111 and 112 are connected at ends thereof to the levers 103 and 104, respectively, and are located opposite the springs 107 and 108, the springs 111 and 112 being fixed at their opposite ends with respect to the machine frame 45. As will be hereinafter described, the discs 101 and 102 coact with the levers 103 and 104 so as to raise the stencil roll 32 when the solenoid 110 is de-energized.

Figure 10:
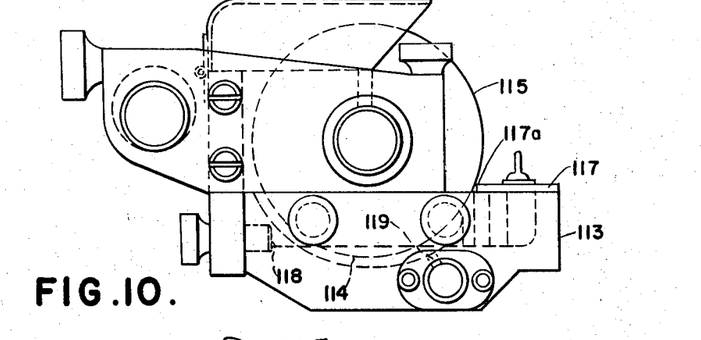
FIG. 10 is a side elevational view of the glue roll and glue pot.
Figure 11:
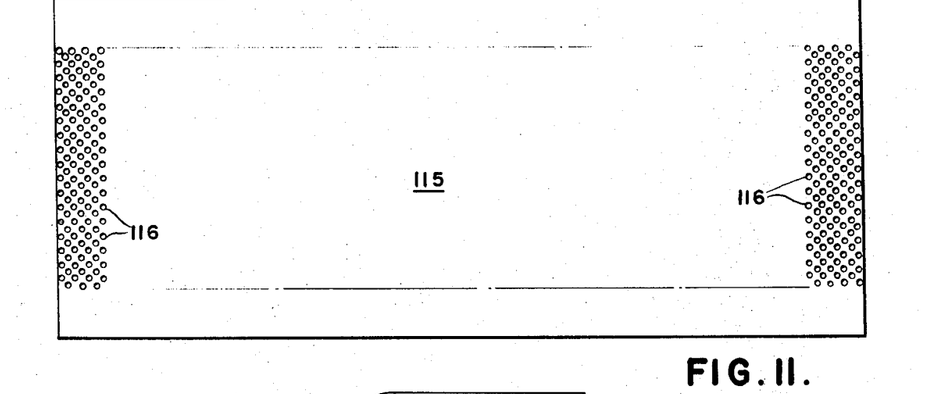
FIG. 11 is a developed view of the face of the glue roll.

The adhesive or glue supply 33 comprises an adhesive reservoir 113 (see FIG. 10) having an adhesive retaining depression 114 therein which is closed on its ends. A roll 115 is partially received in the depression 114, and the roll 115 is provided on its surface with rows of closely spaced, small depressions 116 (see FIG. 11). The reservoir 113 carries a doctor blade 117 which has one edge 117a in closely spaced doctoring relation with respect to the roll 115. The reservoir has an adhesive inlet duct 118 on one side and an outlet duct 119 on the other side; and liquid adhesive is supplied into the depression 114 from the inlet duct 118, and excess adhesive drains from the depression 114 out of the duct 119 to any suitable sump. The roll 115 is so disposed that it is in contact with the raised boss portions 93 to 96 of the stencil roll 32 when the latter roll is in its operative position, as illustrated in FIG. 3.

A pair of spring fingers 120 (see FIG. 3) are fixed at ends thereof and have their other, free ends in contact with the peripheral surface of the stencil roll 32 just below the horizontal center plane 86a (the center of the stencil roll 32 in operating position as shown in FIG. 3 is at substantially the same level as the center of the suction roll 30, namely, in the horizontal plane 86a). The fingers 120 are so located axially of the roll 32 that as the roll 32 rotates, the fingers pass through the gaps 97 separating the raised boss portions 93 to 96. A second pair of similar spring fingers 121 are located at the trailing side of the roll 30, considering the directions of rotation of the roll 30, and have their free ends disposed and traveling in the grooves 78. The backup roll 31 has its center located vertically below the center of the suction roll 30 and is preferably rubber covered so as to accept variations in thickness of the carton blanks.

In operation, the rolls 25, 26, 29, 30, 31, 32, 46, 47, 51, 52 and 115, and also the knife carrying shaft 73 are driven in timed relationship to each other. The polyethylene web A is drawn from its supply roll 21 and all of the parts that operate on this web prior to its contact with the suction roll 30 travel at a fraction of the peripheral speeds of the rolls 25, 26 and 29 and of the knife 74 may thus, for example, be 225 feet per minute while the speeds of the suction roll 30 may be just twice this, for example, or 450 feet per minute. The belts 34 and 35, the belt supporting rolls 46, 47, 51 and 52, the stencil roll 32, the backup roll 31 and the adhesive applicator roll 115 travel at the same speed peripherally as the suction roll 30; and, therefore, their speeds in this particular example are 450 feet per minute. Any suitable driving mechanism (not shown) incorporating belts and chains, for example, may be utilized for driving each of these parts in such timed relationship to each other.

The fundamental reason for the relatively slow speed of travel of the polyethylene web A from its supply roll 21, as compared to the speed of the belts 34 and 35, lies in the fact that carton blanks, as illustrated in FIG. 2, are fed from the table 57 between the belts 34 and 35 in spaced relation to each other, and strips of polyethylene web shorter in length than the blanks as unfolded are applied by the apparatus of the invention. In order to produce a carton, as is apparent from FIGS. 1 and 2, it is only necessary to cover the opening 40 with polyethylene web, and utilizing any greater amount of such web would simply amount to waste. As an example, the carton blanks, as illustrated in FIG. 2, in the direction of movement 58 may be slightly over 13 inches in length, and there may be sufficient spacing between adjacent blanks so that the blanks, center to center, are 18 inches apart. The opening 40 in each carton blank may be about 7½ inches long, so that a strip of polyethylene web of 9 inches in length is entirely sufficient to cover the opening 40.

The polyethylene web A from the supply roll 21 passes over the guide roll 23, the guide plate 24, the guide roll 25, the anvil roll 26 and through the nip between the rolls 26 and 29. The rolls 25, 26 and 29 are all driven at the same peripheral speed, such as for example, 225 feet per minute, and the polyethylene web A thus moves at this speed over the above mentioned parts.

The cutting edge of the slitter disc 27, when the disc 27 is in operating position as shown in FIGS. 3 and 4, is in very close proximity to the anvil roll 26; and the slitter disc 27 thus cuts the polyethylene web A along the center line of the web as the web passes between the nip of the disc 27 and the anvil roll 26. This slitting by the disc 27 is clean except for connecting portions between the two longitudinal halves of the web A produced by the slots 64 in the cutting edge of the disc 27. Thus, a continuous perforation line 43 is produced in the web A.

The web A in continuing its movement along with the roll 26 passes between the rotary knife mechanism 28 and the anvil roll 26, and the knife 74 carried by the rotating shaft 73 makes a brushing contact with the surface of the anvil roll 26 and cuts through the web A transversely of the web. The speeds of the parts are such that the knife is so effective, in one example of the apparatus, so as to produce these transverse cuts every 9 inches along the web A. These transverse cuts are continuous from one edge of the web A to the other except for thin bonds of about 1/16 inch width produced by the notches 75 in the blade 74. These bonds provide sufficient longitudinal strength in the web A so that the web A continues from the cutter mechanism 28 and between the rolls 26 and 29 onto the surface of the suction roll 30 without breakage of the bonds, the web being pulled to have this travel both by the roll 29 having a nip with the roll 26 and also by the roll 30, as will be described.

The web A continues to travel on the surface of the suction roll 30 at the relatively slow speed of the rolls 25, 26 and 29, while the suction roll travels at a considerably faster peripheral speed which is the same as the speed of the rolls 46, 47, 51, 52, 31, 32 and 115. The web A slips on the surface of the suction roll 30, and the suction within the gland 85 applied through the openings 77 holds the web A on the surface of the roll 30. It will be noted that the gland 85 subtends substantially the entire arc of coverage of the web A on the surface of the roll 30.

As the roll 30 rotates, the polyethylene web A travels around the surface of the roll 30 to the horizontal plane 86a on which the exterior surfaces of the rolls 30 and 32 have their places of nearest approach. The exterior surface of the roll 32 is out of contact with the exterior surface of the roll 30 when the roll 32 is in such a rotative position that the boss portions are not between the rolls 30 and 32 in this plane, and the boss portions 93 to 96 would contact the surface of the roll 30 were it not for the presence of the web A on the surface of the roll 30. As the web A travels over the roll 30, the leading end of it reaches a place slightly below the plane 86a; and, at this time, the raised boss portion 96 on the roll 32 passes through the plane 86a and makes contact with the web A as supported on the surface of the roll 30. On continued rotation of the rolls 30 and 32, the boss portions 93, 94 and 95 progressively make contact with and pass over the web A on the surface of the roll 30.

Just as soon as the boss portion 96 makes contact with the web A and grips the web between itself and the suction roll 30 on rotation of the rolls 30 and 32, the web A is accelerated to the higher speed of the rolls 30 and 32; and the web A breaks at the perforation produced by the knife 74 just following the leading end of the web A. As has been hereinbefore explained, the knife 74 in its cutting action leaves only the slight bonds in the web A produced by the notches 75, and these slight bonds break at this time in order to provide a length of polyethylene web sufficient to cover the opening 40.

The exterior surfaces of the boss portions 93 to 96 carry adhesive, and the adhesive thus is printed onto the web A as it passes through the nip between the rolls 32 and 30. The printing is in the same generally rectangular pattern as the boss portions 93 to 96 are arranged with respect to each other, and the timing of the parts is such that the adhesive is printed in this pattern, substantially centered with respect ot both the side edges of the web A and also with respect to the ends of the web segment provided by the breakage of the bonds just described. A segment of web A having adhesive applied close to its side and end edges is thus provided on the exterior surface of the suction roll 30, and the suction within the gland 85 and also within the conduit 88 assures that the web segment with adhesive so applied travels on the exterior surface of the roll 30 toward its nip with the backup roll 31.

In the operating position of the stencil roll 32 as shown in FIGS. 3 and 4, the boss portions 93 to 96 make contact with the pick up liquid adhesive from the surface of the roll 115 as the rolls 32 and 115 rotate. The roll 115 rotates within the depression 114, which is supplied with liquid adhesive from the inlet duct 118, and the roll 115 picks up this adhesive and retains it in its drillings 116. The doctor blade 117, during the rotation of the roll 115, doctors off excessive amounts of the adhesive from the roll 115, so that just sufficient adhesive is applied onto the exterior surfaces of the bosses 93 to 96 as is required for applying a correct amount of adhesive onto the web a to cause it to firmly adhere to the carton blanks one of which is shown in FIG. 2.

The carton blanks, as illustrated in FIG. 2, are fed one at a time from the table 57 or from automatic feeding mechanism (not shown) between the rolls 46 and 51 and between the belts 34 and 35 with the reverse or rough finished sides of the blanks being on top. These carton blanks travel in the direction 58, as shown in FIG. 2, between the belts and are supported by the support rollers 50 acting through the belts 35 until they reach the nip between the rolls 30 and 31. The blanks are inserted between the belts 34 and 35 from the table 57 in such timed relationship with the parts of the apparatus supplying the segments of web A on the surface of the roll 30 to the nip between the rolls 30 and 31 that the leading end of each blank passes through the nip slightly before the leading end of a web segment reaches this nip on the surface of the roll 30 whereby each web segment is applied onto a carton blank to form the sheet 42 centered both longitudinally and transversely on the reverse side of the panel 36 and centered also with respect to the perforation line 41 as the segment and blank pass through this nip. The adhesive applied onto the web segment forms the adhesive line 44 shown in FIG. 2, bonding the sheet 42 to the inner face of the panel 36. The carton blanks with the polyethylene sheets 42 pressed thereon in the nip between the rolls 30 and 31 travel between the belts 34 and 35 until the blanks reach the roll 47 and the end of the upper pass of the lower belt 35. It is contemplated that by the time the carton blanks pass from underneath the rollers 55, the adhesive shall be set at least to a limited extent, so that the sheets 42 cannot easily become dislodged from their positions illustrated in FIG. 2, and a quick setting adhesive is used for this purpose. The carton blanks, as discharged by the belts 35, are collected in any suitable container or by an suitable mechanism (not shown).

The suction within the gland 85 of the roll 30 and also that applied by means of the conduit 88 through the openings 77, is in general, sufficient to assure that the segments of polyethylene web A continue movement with the roll 30 rather than transferring onto the stencil roll 32 and its boss portions 93 to 96 in the plane 86a. In order to assure this result, however, the spring fingers 120 have been provided which travel on the surface of the roll 32 and pass through the gaps 97 separating the boss portions 93 to 96, and these spring fingers will strip off any polyethylene web segment which may adhere to the boss portions 93 to 96. It will be noted that the lips 90 of the conduit 88 are located just below the horizontal plane 86a and the relatively high vacuum within the conduit 88 thus is effective at the point at which such adherence of a polyethylene web segment to the boss portions 93 to 96 would occur, and this extra high vacuum thus also tends to assure that such adherence will not occur.

The vane 84 terminates short of the vertical plane 86 in the direction of rotation of the roll 30 as is apparent from FIG. 15; and, therefore, the suction within the gland 85 is not effective on the web segments as they pass through the nip of the rolls 30 and 31 which would tend to hold the segments onto the roll 30. Therefore, the adhesive may be relied on to carry the segments of web in the form of a polyethylene film A along with the carton blanks forwardly; however, in order to assure this result in all cases, the spring fingers 121, having their free ends within the slots 78 have been provided for stripping the web segments from the surface of the roll 30, if there is any tendency for certain ones of the web segments to remain attached to the roll 30 due to static electricity, for example, past the nip of the rolls 30 and 31 and past the vertical plane 86.

When the roll 21 is exhausted of polyethylene web, the machine may be stopped for a short period of time in order to allow the arm 59 to be rotated through 180° in order to place the roll 22 in the illustrated position of roll 21 in FIG. 3. The trailing end of the web from the roll 21 may then be attached to the leading end of the web from the roll 22 on the curved guide plate 24, the plate 24 functioning as a conveyor table and support on which such attachment may easily be made.

Figure 8:
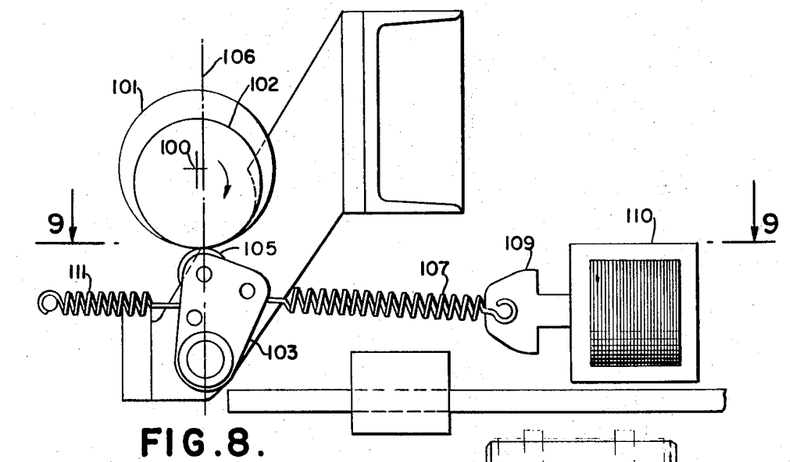
FIG. 8 is a side elevational view partly in cross section taken on line 8—8 in FIG. 6 with certain of the movable parts being in changed positions.
Figure 9:
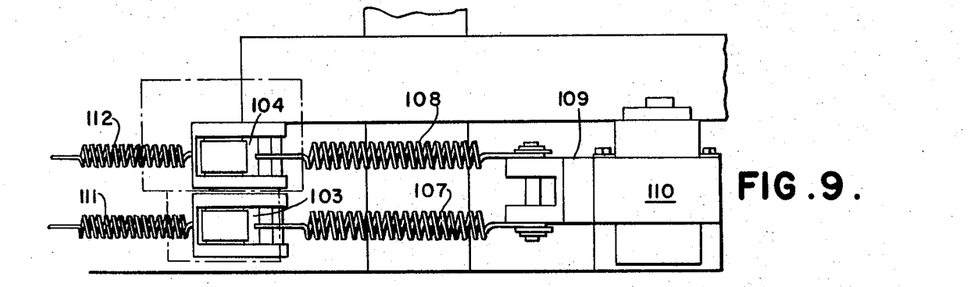
FIG. 9 is a top plan view taken on line 9—9 of FIG. 8.

It is very desirable that the stencil roll 32 be raised from its operative position in which it is illustrated in FIGS. 3 and 4, out of contacting relation with the roll 30 in particular, when, for any reason, the web A ceases to pass through the apparatus. The cam discs 101 and 102, acting in conjunction with the levers 103 and 104 and the solenoid 110, function to quickly raise the stencil roll 32 into an inoperative position when the solenoid 110 is de-energized and to hold it in this raised position. Such de-energization of the solenoid 110 may be done by any suitable automatic mechanism effective on breakage of the web, for example; or the solenoid 110 may be also manually de-energized, if desired. When the solenoid 110 is de-energized, the springs 111 and 112 swing the levers 103 and 104 toward their positions in which they are illustrated in FIG. 8. The rollers 105 carried by the levers 103 and 104 bear respectively on the cam discs 101 and 102, and assuming that the discs 101 and 102 are in their rotative positions as illustrated in FIG. 8 but are lower than illustrated to correspond with the lower operative position of the roll 32 and its shaft 100, the large radius portions of the cam discs block full rotative swinging movement of the levers 103 and 104 until further rotation of the discs 101 and 102 occurs. As the discs 101 and 102 rotate through an additional 180°, the small radius of the disc 102 is substantially on the vertical plane 106 below the center of the shaft 100 so as to unblock the lever 103; and therefore, at this time, the lever 103 rotates into the position illustrated in FIG. 8. The roll 32 and the shaft 100 are still in their lowered positions and, therefore, the disc 101 being circular still blocks full swinging movement of the lever 104.

A further rotation of the discs 101 and 102 causes the eccentric disc 102 to ride up the surface of the roller 105 carried by the lever 103 which is in its upraised FIG. 8 position, and this raises the shaft 100 and the roll 32 into the inoperative position of the latter. At this time, the lever 104 swings into its FIG. 8 illustrated position under the action of its spring 112, since at this time the radii of the discs 101 and 102 are equal with respect to the rollers 105, 105a; and, for continued rotation of the shaft 100 and of the discs 101 and 102, the concentric disc 101 rides on the roller 105a of the lever 104 and maintains the shaft 100 in its FIG. 8 raised position and thereby maintains the roll 32 in raised inoperative position. In this position of the roll 32, the boss portions 93 to 96 are out of position in which they may contact the periphery of the roll 30; and, therefore, adhesive cannot be applied to the periphery of the roll 30 which may not be carrying polyethylene web at this time. As will be understood, the application of adhesive directly to the periphery of the roll 30 is undesirable, since the adhesive may cause subsequent segments of the polyethylene web to adhere to the surface of the roll 30. When the web A has been re-established around the roll 30, the solenoid 110 may be re-energized in order to swing the levers 103 and 104 clockwise as seen in FIG. 8 to allow the stencil roll 32 to return to its operative position as illustrated in FIG. 3.

The apparatus above described advantageously functions to place segments of plastic film onto separated carton blanks, the film segments being shorter in length than the blanks. The bonds provided by the blade notches 75 in the film web A allow the web to travel as a continuous length about the suction roll 30, and the gripping of the web between the boss portion 96 and the surface of the suction roll 30 advantageously breaks these bonds so that the web A is thereby broken into the proper size segments for application to the blanks and is instantaneously speeded up to the high speed of the carton blanks. The segments are thus applied without slippage between the segments and the blanks and due to this fact and since the film web A travels at a constant speed from its supply roll 21 to the suction roll 30, the apparatus is very accurate in applying the film segments to preselected areas of the blanks. The steady speed of travel between the web supply roll and the suction roll is important particularly with a web of polyethylene, since this material is somewhat rubber-like and can distort particularly by reducing in width under undue tension. Since adhesive is applied onto the film rather than onto the blanks themselves, difficulties which might accrue from the latter, particularly by having adjacent blanks in a stack adhere to each other due to slight misplacement of the adhesive, are avoided. A quick acting mechanism effective in a single rotation of the stencil roll 32, comprising in particular the cam discs 101 and 102 and co-acting lever arms 103 and 104, has been provided to prevent the roll 32 from applying undesired adhesive onto the surface of the suction roll 30 and perhaps plugging the openings 77.

Although I have described the web A as being in particular a web of polyethylene, it is to be understood that any other flexible film may be utilized instead, such as films of Cellophane or Mylar. Also, it is to be understood that although I have described the blanks to be used with the machine as carton blanks, other blanks, such as windowed envelope blanks, or in fact, any type of blank, windowed or not, to which it is desired to apply a film, may be used in the apparatus. It will be understood to those skilled in the art that other changes may also be made without departing from the principles of the invention, and therefore, the invention is not to be limited to the specific constructions and arrangements shown and described, except only insofar as the appended claims may be so limited.

What is claimed is:

1. An apparatus for applying patches of flexible film to blanks moving along a path of travel in predetermined spaced relationship, comprising a roll for transporting the patches around its periphery as the roll rotates, said roll being a suction roll for causing the patches to adhere to the roll and the suction roll having said path of travel substantially tangent to the roll so that patches are applied directly from the roll to blanks in said path of travel, means for supplying the patches on said roll, said patch supplying means being effective for feeding a web of the flexible film onto said suction roll at a slower speed than the speed of said suction roll, a stencil roll having a nip with said first named roll and rotating in contact with patches carried by said first named roll, means for partially cutting the web of film transversely thereof prior to its reaching said stencil roll, said stencil roll by reason of its nip with said suction roll gripping the web between it and the suction roll whereby to break the web along a following transverse partial cut thereof so as to provide a said patch of the film traveling on the suction roll to a blank in said path of travel, and means for applying liquid adhesive to the surface of said stencil roll so that the stencil roll applies adhesive to the patches for causing the patches to adhere to the blanks as the patches are applied to the blanks.

2. An apparatus as set forth in claim 1, and means for partially longitudinally slitting the web of flexible film as it is supplied onto said suction roll.

3. An apparatus as set forth in claim 2, said cutting means comprising an anvil roll across which the web of film passes prior to application on said suction roll and a rotatable cutter knife having a notched cutting edge movable into contact with the anvil roll as the knife rotates for providing a partial cut across the web, said slitting means comprising a notched slitting wheel in contact with said anvil roll and having its axis extending parallel with that of said anvil roll.

4. An apparatus as set forth in claim 1, said stencil roll having raised boss portions on its periphery which are arranged in a closed pattern and to which the liquid adhesive is applied so that a similar pattern of adhesive is applied onto the patches of flexible film for causing the patches to adhere to the blanks on marginal portions of the patches.

5. An apparatus as set forth in claim 1, said stencil roll having raised boss portions on its periphery, a liquid adhesive reservoir, and an adhesive roll rotatably disposed in said reservoir so as to collect adhesive therefrom and disposed in contact with said boss portions as said stencil roll rotates whereby to apply adhesive onto said boss portions for subsequent transfer onto patches of flexible film carried by said suction roll.

6. An apparatus as set forth in claim 1, and a backup roll located adjacent to said suction roll and being rotatably disposed on an axis parallel with that of the suction roll and being substantially spaced around the periphery of said suction roll from said stencil roll, said suction roll comprising a perforated hollow outer shell, and a suction gland within said shell extending from substantially the place of closest approach of the suction roll to said backup roll and subtending an angle greater than that subtended by said backup roll and said stencil roll measured at the center of said suction roll, and a conduit for carrying a higher suction and having its end disposed in close proximity to the internal surface of said shell close to the nip between said suction roll and said stencil roll and spaced from said nip in the direction of rotation of said suction roll.

7. An apparatus as set forth in claim 1, and means for raising said stencil roll away from said first named roll and comprising a pair of cams rotatably fixed with respect to said stencil roll and a pair of levers each swingably mounted on one end and respectively effective on said cams, one of said cams being eccentric with respect to the center of rotation of said stencil roll so that the respective lever may move substantially into alignment with a radius of the cam and thereby raise said stencil roll on further rotation of the stencil roll and the other of said cams being substantially concentric with respect to the axis of said stencil roll and allowing its said lever to move into a substantial radius with respect to the cam after said stencil roll has been so raised whereby the stencil roll remains in its raised position on further rotation of the stencil roll.

8. An apparatus as set forth in claim 7, and an electric solenoid for swinging said levers out of the radii with respect to their respective cams and thus moving them to inoperative positions to allow said stencil roll to have its nip with said first named roll, and a spring effective on each of said levers tending to return the levers into their operative positions substantially on radii with respect to their respective cams.

References Cited

UNITED STATES PATENTS

| | | | |
|---|---|---|---|
| 2,202,496 | 5/1940 | La Bombard | 156—521 X |
| 2,385,751 | 9/1945 | Whipple et al. | 156—521 X |
| 3,239,097 | 3/1966 | Bates et al. | 221—48 |
| 3,300,363 | 1/1967 | Burroughs | 156—521 |

HAROLD ANSHER, Primary Examiner

J. D. SMITH, Assistant Examiner

U.S. Cl. X.R.

156—257, 271, 552